Oct. 6, 1936. J. C. CARLIN ET AL 2,056,388
METHOD OF AND APPARATUS FOR APPLYING AN OPENING THREAD
OR STRING TO WRAPPED COMMERCIAL PACKAGES
Filed March 26, 1935 10 Sheets-Sheet 1
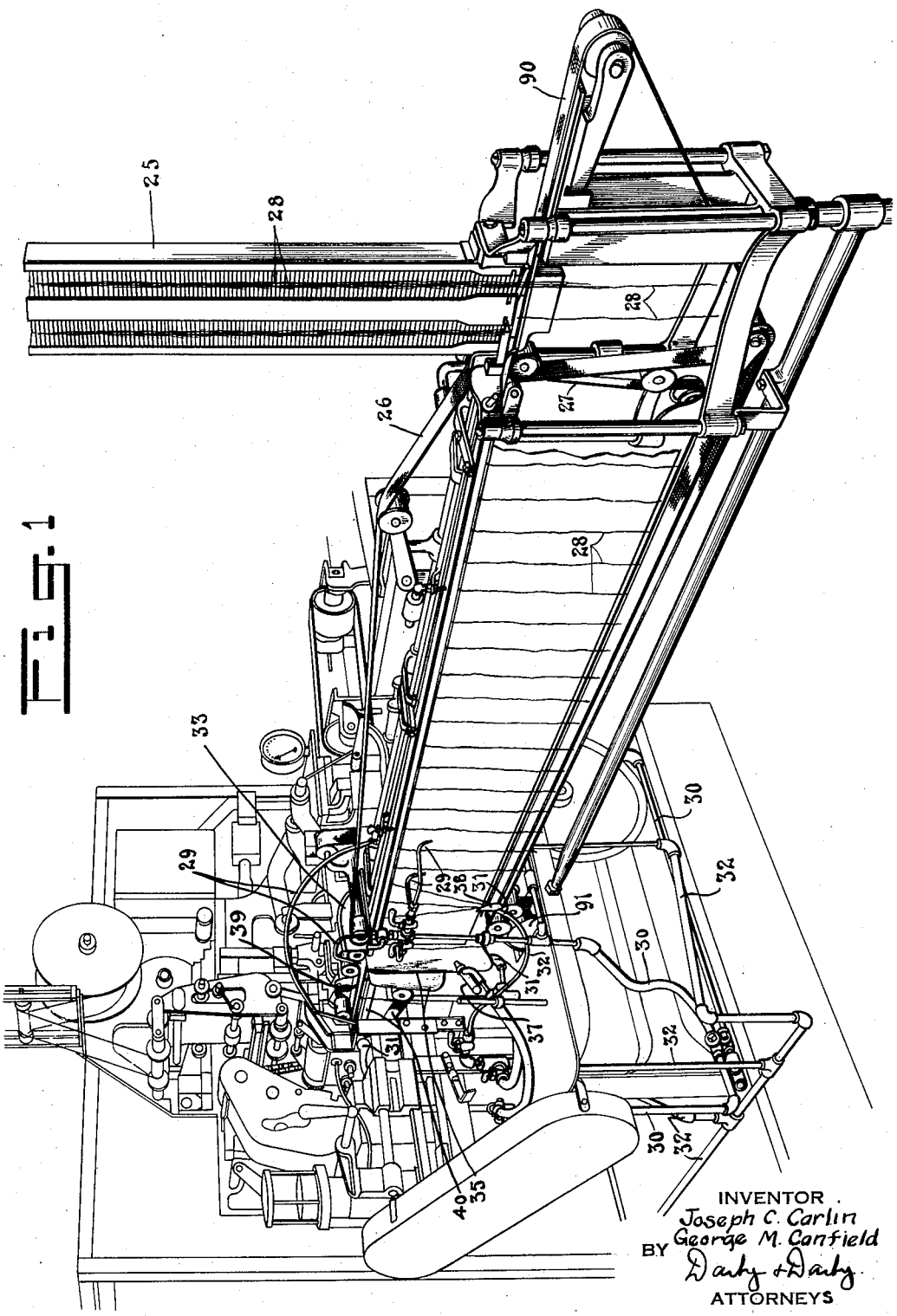
INVENTOR.
Joseph C. Carlin
George M. Canfield
BY
Darby +Darby
ATTORNEYS

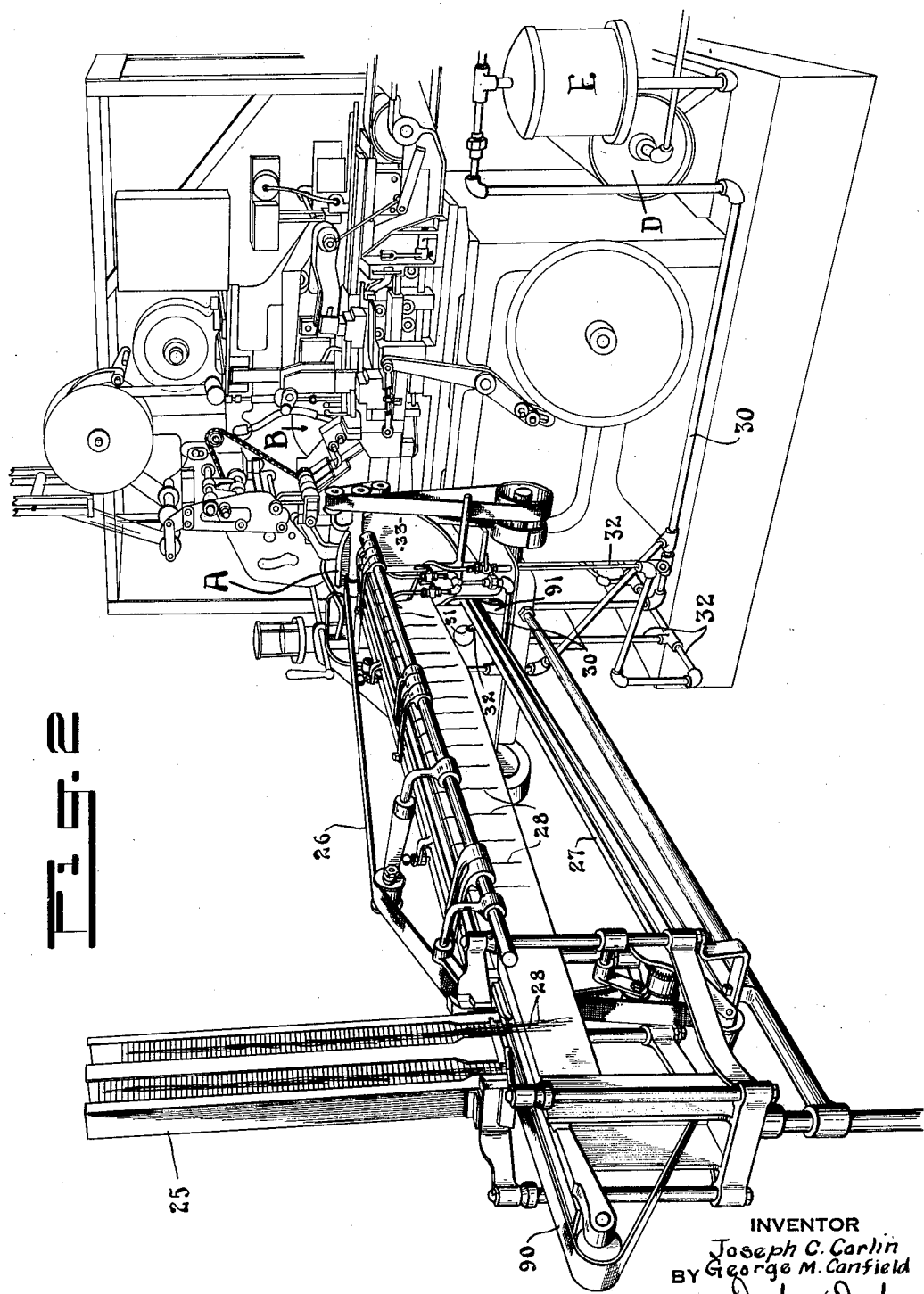

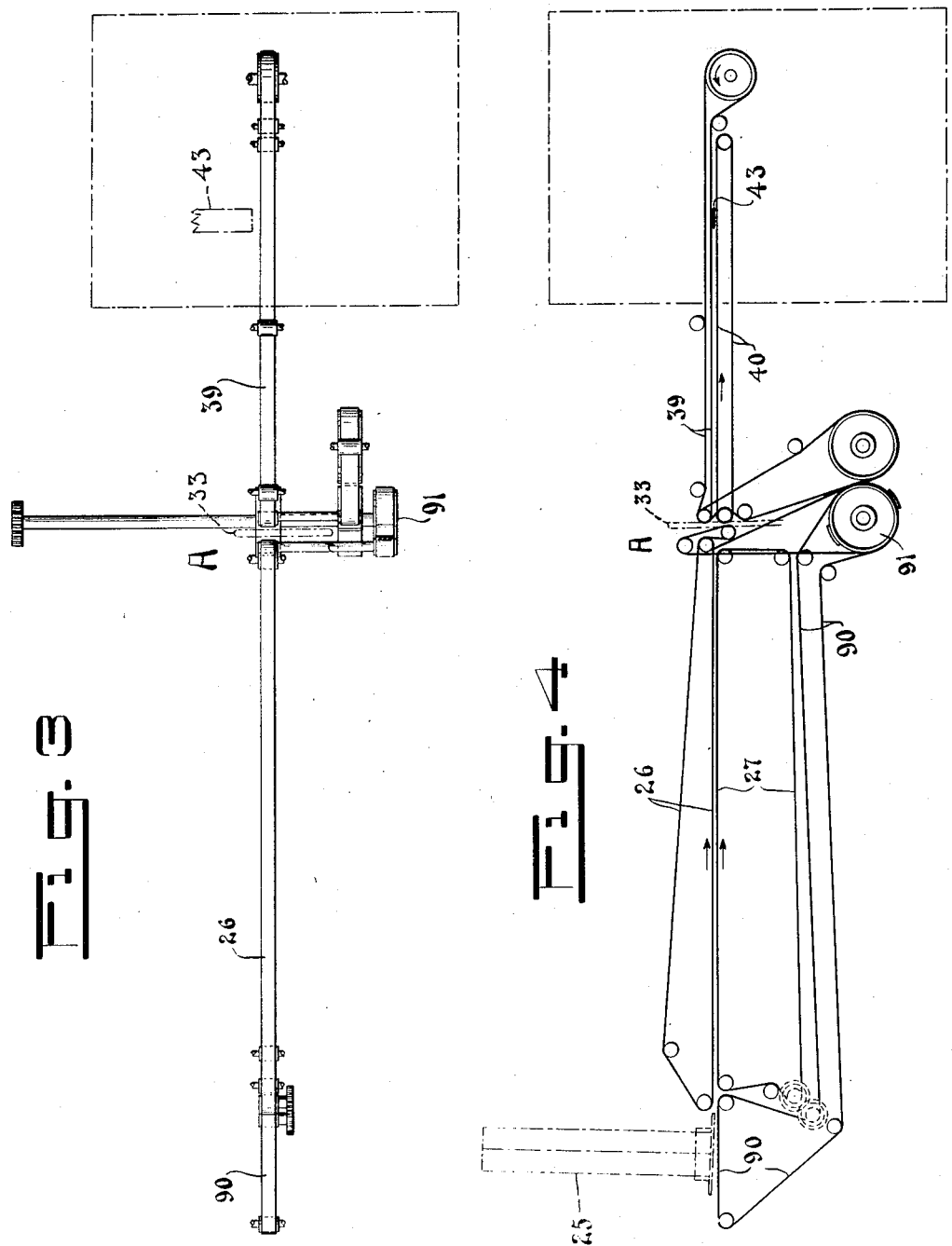

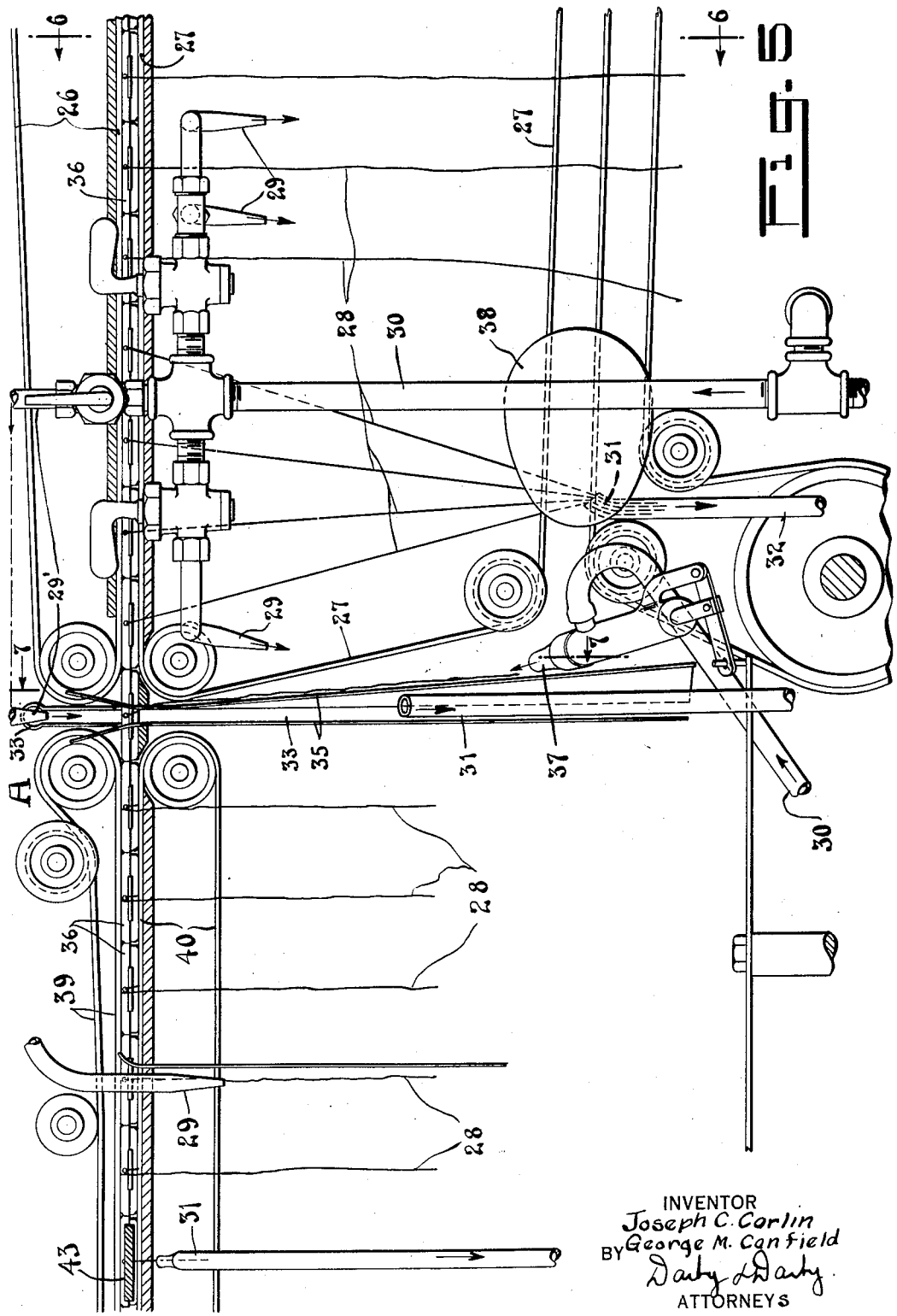

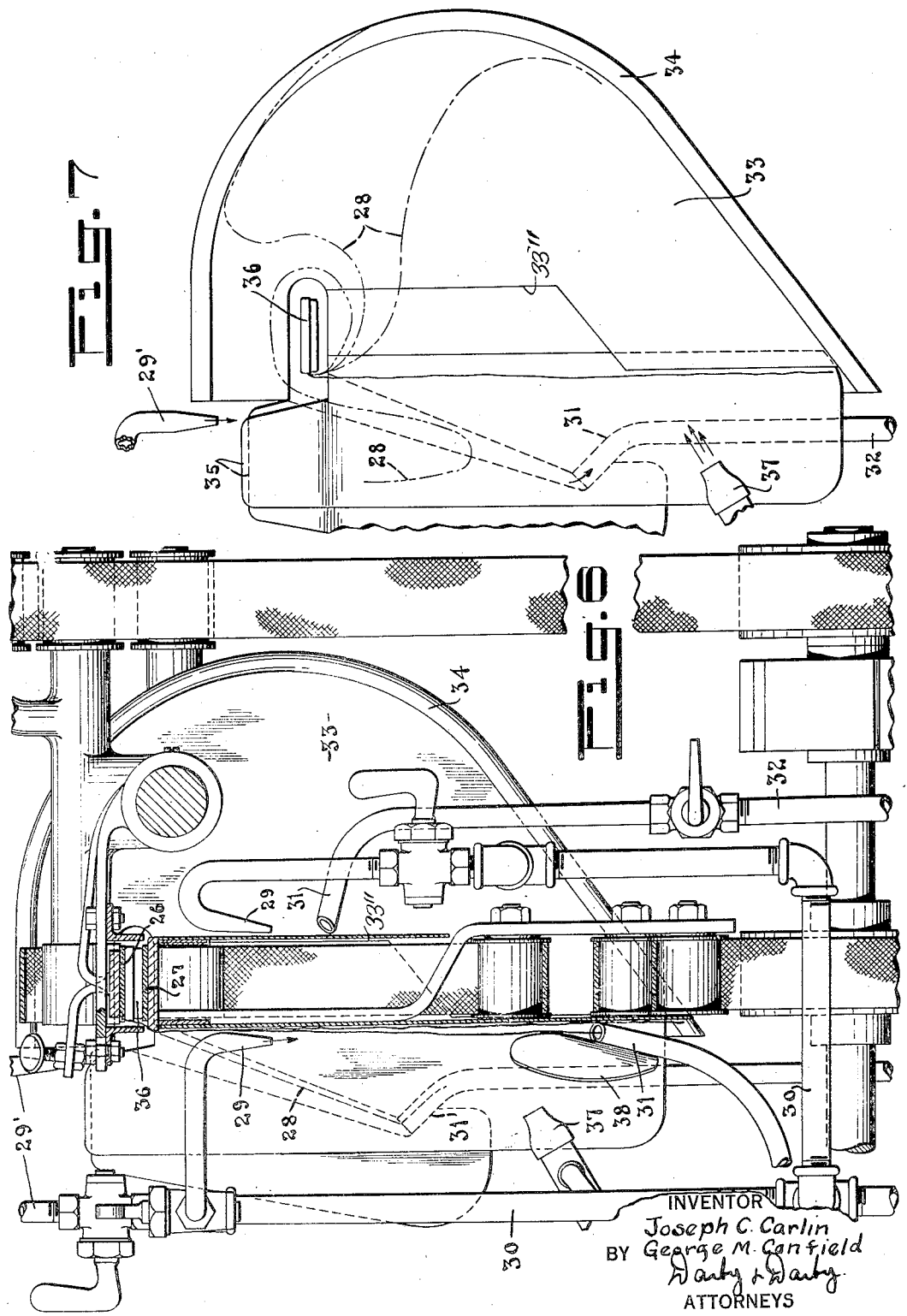

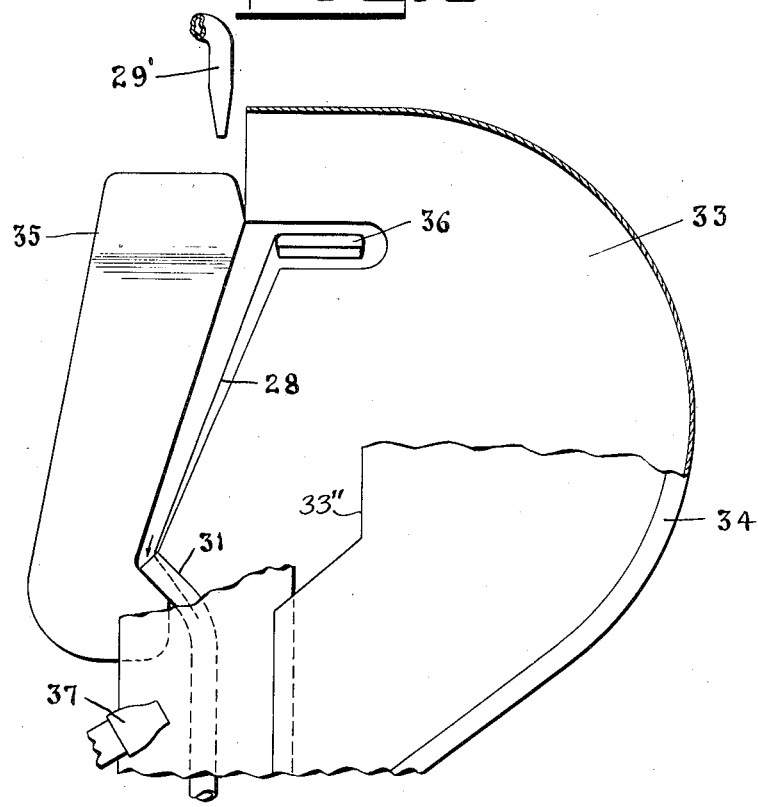
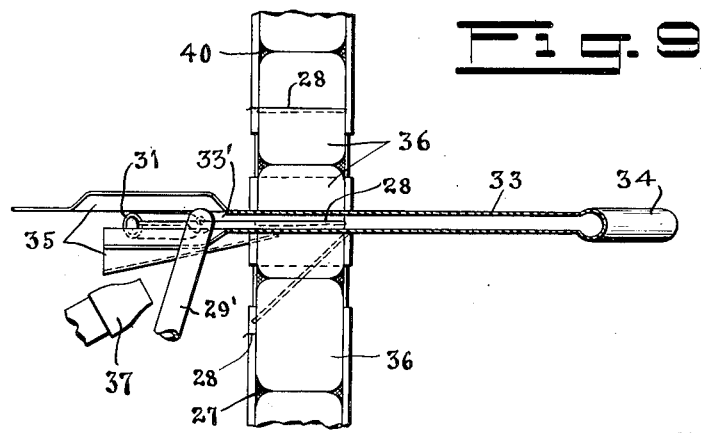

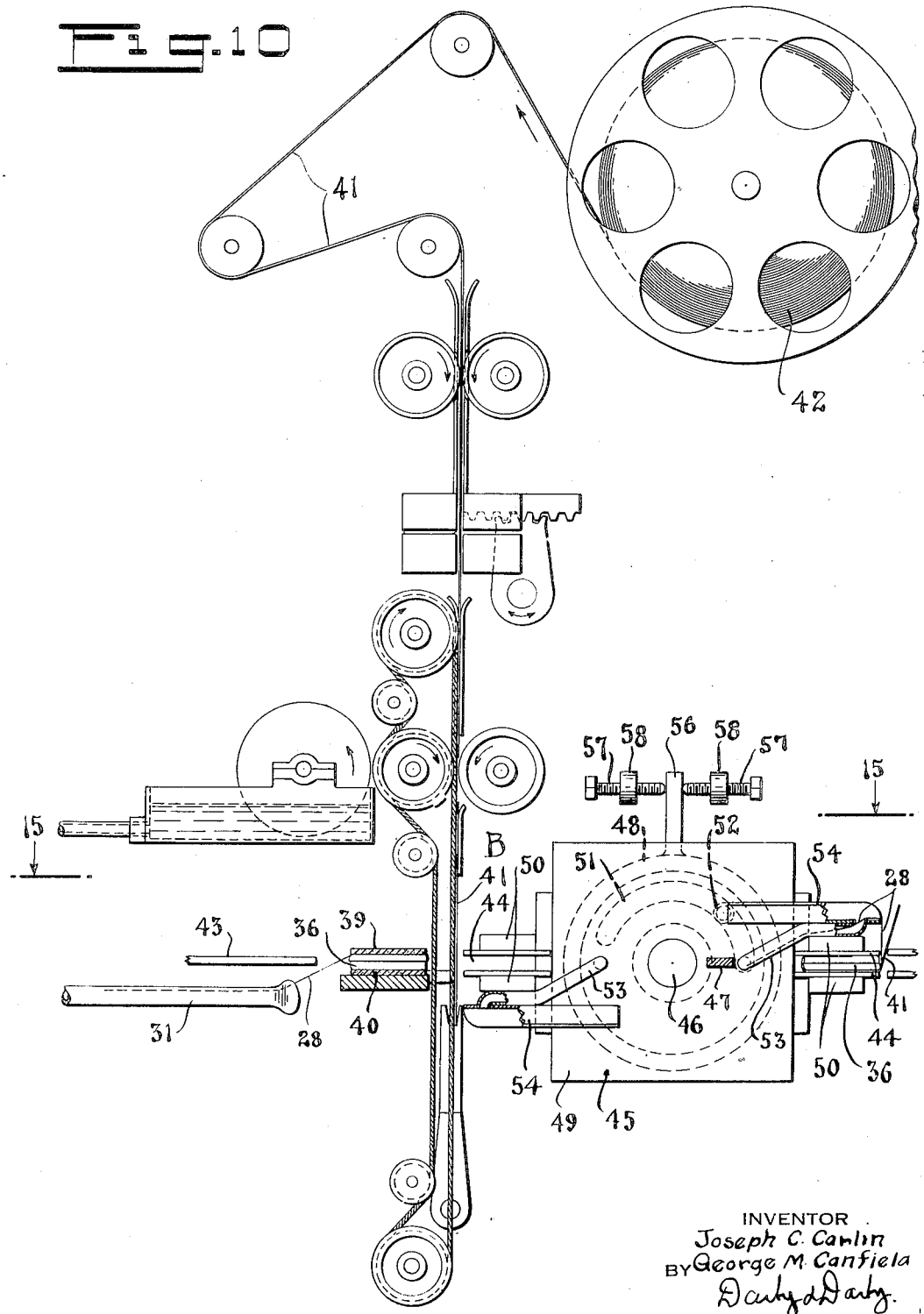

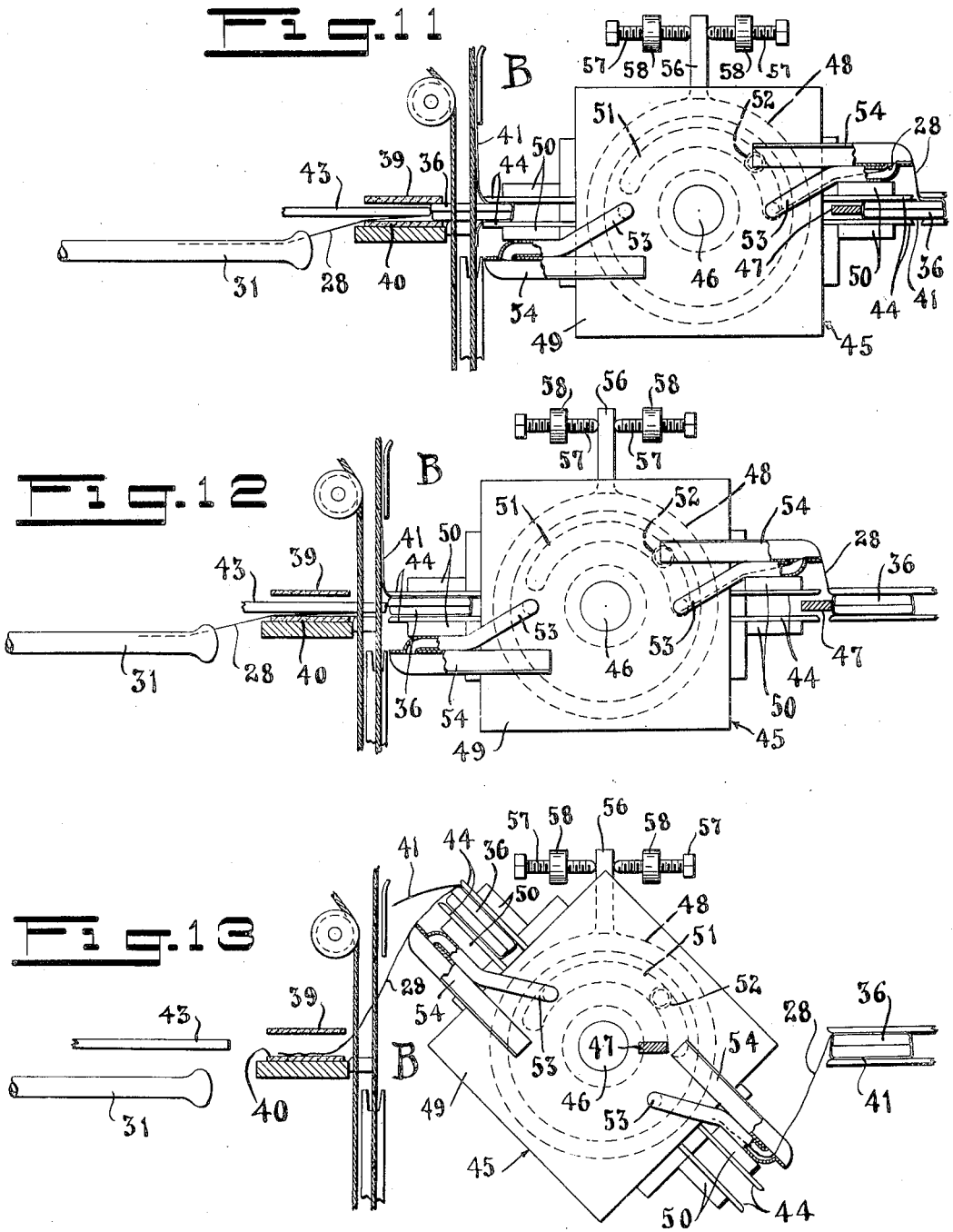

Oct. 6, 1936.  J. C. CARLIN ET AL  2,056,388
METHOD OF AND APPARATUS FOR APPLYING AN OPENING THREAD
OR STRING TO WRAPPED COMMERCIAL PACKAGES
Filed March 26, 1935  10 Sheets-Sheet 9
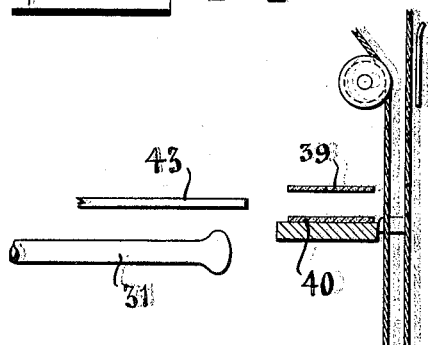
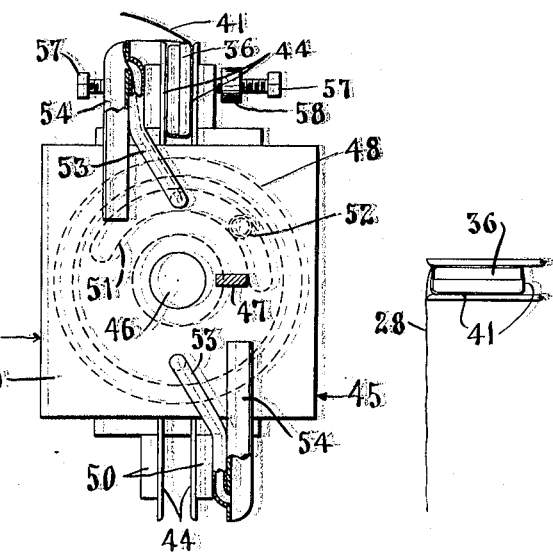
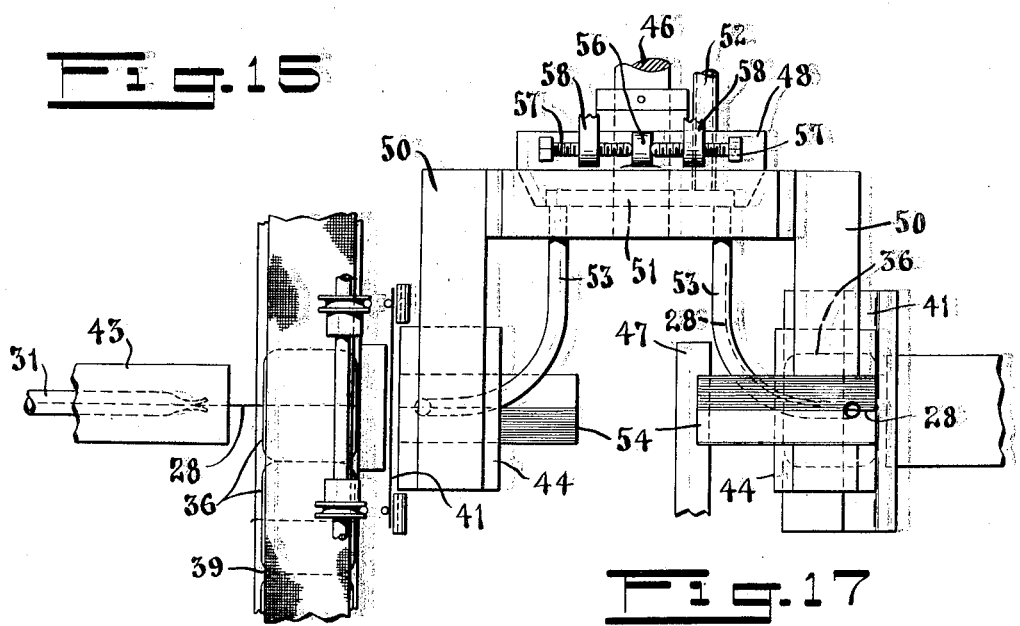
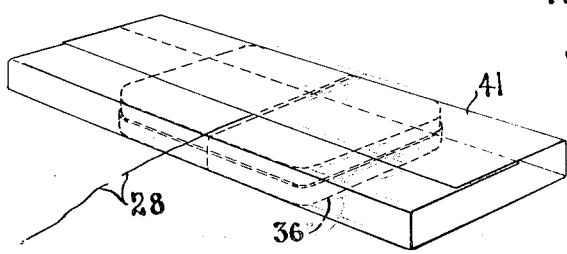
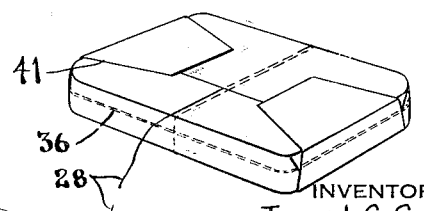
INVENTOR
Joseph C. Carlin
BY George M. Canfield
Darby & Darby
ATTORNEYS

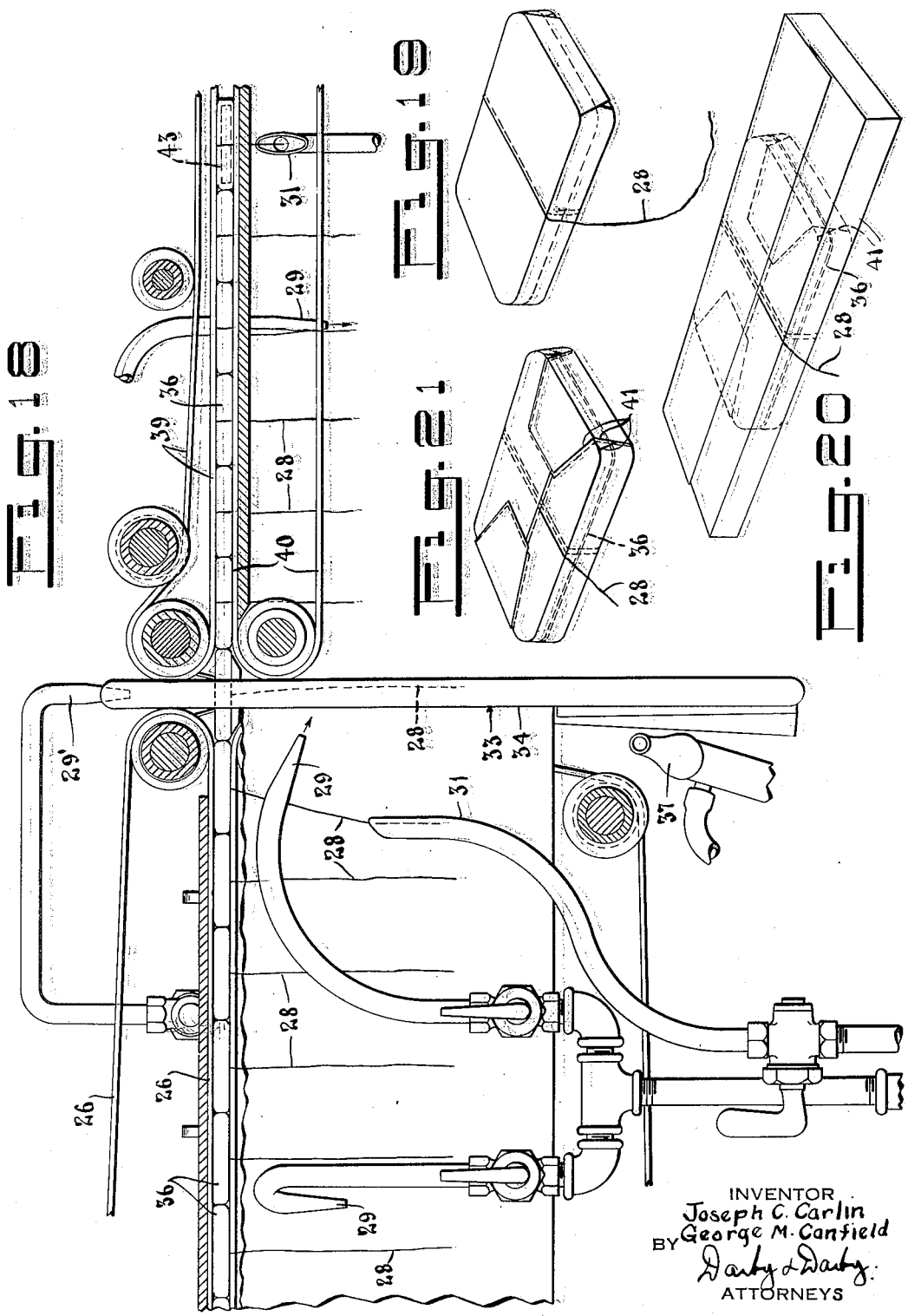

Patented Oct. 6, 1936

2,056,388

UNITED STATES PATENT OFFICE 2,056,388

METHOD OF AND APPARATUS FOR APPLYING AN OPENING THREAD OR STRING TO WRAPPED COMMERCIAL PACKAGES

Joseph C. Carlin and George M. Canfield, Nashville, Tenn., assignors to Tennessee Products Corporation, Nashville, Tenn., a corporation of Tennessee Application March 26, 1935, Serial No. 13,102

31 Claims. (Cl. 93—2)

This invention relates to a method of and apparatus for applying an opening or cutting string, or thread, to commercial packages around which coverings or wrappers of "Cellophane", or other material have been applied.

More specifically, the process and apparatus constituting the present invention relates to the application of an opening thread, or filament, around a package inside of a covering or wrapper applied to the packages, and in such manner that the free end of the severing, or cutting filament remains exposed, to enable the same to be grasped and unwound from the wrapped package, thereby cutting, or severing, the wrapping material, to enable the wrapping to be easily and readily removed from the package.

In carrying out the invention, we propose to wind the severing, or cutting filament one turn about the package before the package covering is applied thereto, and then apply the covering by wrapping the same around the package so as to enclose the single turn, or winding, of the severing thread, and then, if desired, applying a second turn, or winding, of the severing thread, or filament, around the package on the outside of the previously applied wrapping, and, thereafter, applying a second wrapping, or covering, to the package, the free end of the severing thread, or filament, protruding from the second wrapping, or covering, of the package, so as to enable the severing thread, or filament, to be grasped and then unwound from the package, thereby successively severing, or cutting, the two coverings, or wrappings.

In the following description we desire it to be understood that when we specify a thread as the opening or severing means, we desire to include a string or filament or other suitable flexible device which may be suitable for the purpose. We also desire to be understood that when we refer to the package covering or wrapper as being of "Cellophane", we desire to include wrappers or coverings of any other suitable material, and whether transparent or opaque, which is capable of being cut or severed by the unwinding of the opening thread.

Generally, in carrying out the process of the invention, one end of the severing thread is secured in any suitable or convenient way to the package to be wrapped. The packages, each with a freely dependent severing thread attached thereto are then successively presented to the action of a wrapping machine, by which a wrapper of "Cellophane" is applied to and wrapped upon the package. This operation is accomplished in a wrapping machine of any desired or usual structure. Before the packages are presented to the action of the wrapping machine, the depending cutting thread is given at least one complete turn, or winding, around the package. In accomplishing this result, it is necessary that the depending threads be maintained in straightened condition so that when the thread is wrapped around the package, it will be accurately placed on the package without kinking or displacement. To accomplish the desired control of the depending ends of the severing threads we have found that excellent results may be obtained by employing an air jet or suction action at various points along the line of progress of the package with their depending threads, which jet or suction action acting on the free ends of the threads maintain the said free ends in straightened and proper position.

We have also found that excellent results are accomplished in effecting the first winding of the single turn of the free end of the thread to control the winding of the thread about the package through the action of an air jet and suction imposed upon the free or loose end of the thread in such manner that the thread or filament is given one complete turn around the package.

The packages with the single turn or winding thereabout of the severing thread maintained in closely wrapped condition about the packages, are introduced into a standard machine for applying a wrapping or covering of "Cellophane", around the package, thereby enclosing within the wrapping the single turn of the severing thread.

The loose severing threads should be of sufficient length to enable each of them to be wrapped one or more times around a package and still leave a free end portion protruding from the package after its wrapping of "Cellophane" has been applied thereto.

Where only one thickness or wrapping of the "Cellophane" is to be applied to the package, the package is delivered from the wrapping machine and is ready for marketing.

In many instances it is desirable to apply a double wrapping to the packages, so as to insure protection of the contents of the package from moisture, dampness, or the like. In that case the severing threads should be of sufficient length to enable the same to be wound at least twice around the package, so that after the first application of the severing thread or filament, and after the first wrapping or covering material has been applied to the package over the winding of the severing thread, the package is again progressed to the action of the suction and air jet operations, whereby a second winding of the severing thread is applied over the initial wrapping of "Cellophane" and then the package is again passed through the wrapping machine, and the second wrapping of "Cellophane" is applied, as before, so as to enclose the second winding of the severing thread.

This, generally, is the operation and method we have devised for accomplishing the results.

The various steps of control of the thread, and the winding of same with one or two turns around the packages, may be accomplished and carried out practically in a wide variety of specifically different mechanical arrangements, or, if desired, by hand manipulation or operation, although, in practice, and in order to secure speed of production we have found it preferable to employ suitably adjustable and controllable mechanical devices for subjecting the loose ends of the opening threads to air jets and suction action in accomplishing the winding of the threads around the packages and in accomplishing these various operations during the continuous, step by step progression of the packages to the action of the ordinary wrapping mechanism of the wrapping machine.

In the accompanying drawings we have shown an illustrative mechanical structure adapted to be applied to an ordinary standard structure of wrapping machine for applying wrappers of "Cellophane" and opening or severing threads to commercial packages of various sorts, sizes and character.

Referring to the accompanying drawings,—

Figure 1 is a view in perspective, of a package wrapping machine of well known construction, to which we have applied package feeding and air jet and suction devices to effect the efficient control of the severing thread or filament, and the winding of the same in one turn about the package as they are successively fed to the operation of the wrapping machine.

Fig. 2 is a view similar to Figure 1 showing the opposite side of the package feed and thread controlling attachment constituting our present invention.

Fig. 3 is a detached, detail view, in top plan, illustrating the means for progressing the packages successively to the wrapping machine, and for applying a single turn or winding of the severing thread around the successive packages before the latter are presented to the operation of the wrapper-applying mechanism of the wrapping machine.

Fig. 4 is a view in side elevation of the devices illustrated in Fig. 3;

Fig. 5 is a broken detail view partly in vertical longitudinal section of a form of mechanism embodying the invention, illustrating the method of controlling and maintaining the depending wrapper severing threads and the application thereof in a single turn, around the packages preparatory to the delivery of the packages to the action of the wrapping machine to receive the cover wrappings;

Fig. 6 is a broken, detail view in vertical transverse section on the line 6—6, Fig. 5, looking in the direction of the arrows;

Fig. 7 is a similar view on the line 7—7, Fig. 5, illustrating in more detail one method of applying a single turn winding of the severing thread to the package;

Fig. 8 is a broken view, similar to Fig. 7 illustrating the action of the thread controlling and winding operations, after the completion of a single turn winding of the thread with the thread held taut around the package.

Fig. 9 is a view, in top plan, parts in horizontal section of the structure shown in Fig. 8;

Fig. 10 is a broken detail view, somewhat diagrammatic, and parts in section, illustrating portions of the wrapping machine employed in initially applying the "Cellophane" wrappings to the packages and devices for transferring the packages to the wrapper sealing mechanism, and illustrating means in accordance with our invention, for maintaining the threads in proper position and placement while the covering material is being wrapped around the package. For the greater part thereof, the apparatus shown in Fig. 10 is of a standard type of wrapping machine, but modified in certain particulars, as will be more fully pointed out, to secure and maintain a proper control of the severing threads while the wrapper is being applied to one package with another package in position to be advanced into the wrapping material.

Fig. 11 is a view similar to Fig. 10 illustrating somewhat more in detail the modifications incorporated in accordance with our invention into the wrapping mechanism of the wrapping machine, one package with its severing string or filament being shown partly advanced into the wrapping and transfer devices, and another package being shown in position ready to be ejected from such devices.

Fig. 12 is a view similar to Fig. 11 showing a package being delivered into the transfer tumbler of the wrapping apparatus, and another being ejected therefrom.

Fig. 13 illustrates the structure shown in Figs. 11 and 12 with the tumbler portion of the wrapping apparatus displaced from alignment with the receiving and ejecting devices during the operation of applying the covering material to the packages.

Fig. 14 is a view similar to Fig. 13 with the tumbler device of the wrapping mechanism displaced one-quarter of a turn, in accomplishing its package tumbler functions.

Fig. 15 is a broken detail view, in horizontal section, on the line 15—15, Fig. 10, looking in the direction of the arrows.

Fig. 16 is a view in perspective illustrating a package to which a cover wrapping has been applied at the point in the operation of the tumbler mechanism of the wrapping machine as illustrated in Fig. 14, and before the ends of the cover wrapping are folded and tucked into final position.

Fig. 17 is a similar view showing the completion of the wrapping operation, after the ends of the cover wrapping have been folded, tucked, and secured around and upon the package, and showing the free end of the severing thread or filament projecting loosely from the package.

Where only a single cover wrapping is applied to the package, the article as shown in Fig. 17 is the completed article, ready for the market.

Fig. 18 is a view similar to Fig. 5 looking from the opposite side of the machine, and illustrating the package and the severing or cutting thread during the second operation of applying a second winding of the severing thread to the packages which have been delivered from the wrapping machine in the form illustrated in Fig. 17, where a second cover wrapping is to be applied to the previously wrapped package.

Fig. 19 is a perspective view illustrating the package after the severing thread has been applied in a second winding to the previously wrapped package.

Fig. 20 is a view in perspective illustrating the application of a second cover wrapping to the packaged product shown in Fig. 19, and before the ends of the second wrapping have been folded, tucked and secured upon and to the package.

Fig. 21 is a similar view illustrating the package after the tucking, folding and securing the ends of the second cover wrapping. The package, at this stage, is ready for the market with two successive cover wrappings applied thereto, the inner covering enclosing the first winding about the package of the severing thread, and the second cover wrapping enclosing the second winding of the severing thread, and with the free end of the severing thread protruding loosely from the package.

The same part is indicated by the same reference numeral wherever it occurs throughout the several views. While we have partially shown a particular wrapping machine for applying cover wrappings to packages, it is to be understood that our invention pertains more particularly to methods of operation and structures which are supplemental to, and, in the case of the air jet and suction mechanism, form attachments for the wrapping machine, only certain special details of modification being incorporated in the wrapping machine itself in carrying out the objects and purposes of our invention. We therefore do not deem it necessary to describe in minute detail the structure or operation of the wrapping machine itself, except insofar as the mode of operation and apparatus constituting our invention coordinates with the mechanism and operation of the wrapping machine, in timed relation thereto, to secure a continuously operating apparatus, as the wrapping machine itself,—except as it has been modified to incorporate the features of our invention and to effect new combinations with the features of our invention—constitutes no part of our present invention.

In carrying out our invention the packages, each equipped with a severing thread attached at one end thereto at a convenient point, are stacked into a hopper, or magazine device indicated at 25, Figs. 1, 2 and 4 from the bottom of which the packages are successively received by carrier devices by which they are progressed to the wrapping machine. For example, the thread may be passed through a hole in the package as seen from Figure 19 and knotted on the end. In the form shown the progression of the packages is accomplished by means of parallel spaced apart endless belts 26, 27, the belt 26, being disposed vertically above and parallel to the belt 27, the two carrying runs of the belts operating in the same direction as indicated by arrows in Fig. 4. The packages are delivered successively into the space between the carriers 26, 27, in the illustrative arrangement shown, by means of an endless traveling belt, a portion 90 of the upper run of which passes beneath or transversely across the lower open end of and forming the bottom for the magazine, see Fig. 4. The lowermost package in the magazine rests upon this portion 90 of the upper run of the belt and is advanced from the magazine and delivered to the space between the carriers 26, 27 whenever the belt 90 is actuated. This belt is actuated in timed relation with the operation of the wrapping mechanism from any convenient source of power, as for example, through the pulley 91 which is driven from a convenient driving part of the wrapping machine. The carrier belts 26, 27, which preferably operate in a step-by-step movement likewise may be driven and actuated from any suitable source of power. They are trained over convenient guides to enable the packages to be successively received between them.

As the packages are progressed by the carriers 26, 27, the severing threads 28 depend loosely and freely from said packages, being secured at one end thereof at a convenient point on the package before the packages are placed in the magazine 25.

One of the important features of our invention resides in the provision of means to maintain the depending ends of the threads 28 free from entanglement with each other and in more or less straightened condition, and to prevent them from becoming kinked or disarranged while the packages are being progressed to the point, indicated generally at A, where the threads are to be given a single turn winding around and upon the packages. It is also important that the loose ends of the thread be maintained free from kinks or disarrangement during the progress of the packages towards the point indicated generally at B where the packages have applied thereto their cover wrappings. We have also found it important to impose a mild pull lengthwise upon each depending thread as it approaches the point where the thread is to be wound about the package and also at the point where the thread wound package is delivered to the cover wrapping mechanism. It is of special importance, as we have found, to maintain the threads free from entanglement and kinking while they are being applied around the package, as well as when the wrapping material is being applied to the package.

These various features of our invention may be carried out and the desired results achieved in various ways, whether manually, or automatically by suitable mechanical devices. In the illustrative arrangement shown, see particularly Fig. 5, suitable nozzles 29 are disposed at various points along the path of progression of the packages towards the point A, where the threads are to be given a turn around the packages. These nozzles are arranged to deliver jets of air downwardly, as indicated by the arrows in Fig. 5, and along the lengths of the depending threads 28, thereby serving to maintain the threads separated from each other and free from kinks or disarrangement. Similar nozzles are similarly arranged between the point A, where the threads are wound around the packages, and the point B, where the cover wrappings are applied to the packages. While only one such nozzle 29 is shown, see Fig. 5, between the points A, and B, it is to be understood that as many of them may be employed as desired or required. The various nozzles 29 are connected through pipes 30 to the discharge side of an air compressor or pump not shown. This air compressor delivers into an expansion chamber or tank D, the function of which is to permit the air delivered from the pump to expand thereby eliminating pulsations from the air delivered from the compressor. From the expansion tank or receiver D, the compressed air passes through a filter chamber E, the function of which is to remove from the air any oil or other deleterious matter contained therein. The filter chamber E, delivers into the pipe connections 30. At any suitable point in pipe connections 30 a valve device is provided which is opened and closed periodically to permit the delivery through said pipe connection 30 of jets of air to the various nozzles.

As the packages with the depending threads attached thereto are progressed step by step, towards the point where the threads are given a turn around the boxes, the depending free ends of the threads are individually and successively brought now and again under the influence of the downwardly directed air jet and hence are maintained in straightened condition free from kinks or disarrangement. As the packages approach the point A, and as above stated, a mild lengthwise pull is exerted upon the downwardly depending free ends of the threads. This is accomplished by causing the depending free ends of the threads to come within the range of influence of an air suction. This is accomplished by arranging a suction nozzle 31 adjacent the path of progression of said depending free ends. The suction nozzles 31 are connected through suitable pipe lines 32, see Fig. 1, to the intake side of the compressor or air pump so that at each intake impulse of the air pump a suction action is exerted at the nozzles 31. This action exerts upon the depending free ends of the severing threads a mild drawing action lengthwise of the threads. This imposes a lengthwise tension upon the ends of the threads from which tension the threads are successively released as the packages progress beyond the range of influence of the suction nozzles and into position for the threads to be given a turn around a package. If desired, and in order to efficiently guide the depending ends of the threads into the sphere of action of a suction nozzle 31, a vertically disposed guiding plate indicated at 38 is mounted in the vicinity of the suction jet 31, or slightly in advance of said suction jet. This guide plate serves to aid in guiding the dependent ends of the threads into the area of action of the suction jet.

As above stated it is proposed to effect a single turn or winding of the severing thread around or about each package. In accordance with the principles of our invention we propose to utilize air jets and suction to effect the winding of each thread around the package to which one of its ends is attached. This operation is accomplished at the point indicated generally at A, see Fig. 5. At this point in the attachment we mount a vertically disposed hood or chamber 33, see Figs. 7, 8 and 9. This hood is open at its front vertical edge 33' and it is so disposed as to extend transversely across the line of progression of the packages. The interior chamber of the hood 33 is narrow with a somewhat enlarged area at its rear vertical wall as indicated at 34. The line of passage of the packages intersects the hood 33 at right angles as most clearly shown in Figs. 8 and 9. One of the side walls of the hood 33, at its front vertical edge, is slightly offset or flared as indicated at 35 in front of the line of progress of the packages 36. Positioned at a convenient point to one side of the line of travel of the packages and opposite the hood 33 or the chamber thereof, is an air jet 37 of the nature above described. This air jet is mounted so as to be adjustable as to its line of projection of the air jet in operation. When a package is brought into position for its attached severing thread to be applied around it, a strong jet of air is imposed upon the thread, thereby driving it transversely of the line of progression of the box and into and upward through the narrow chamber of the hood 33 and over and around the package. The curved rearward edge 34 of the hood serves to guide the loose or free end of the severing thread, as clearly indicated in dotted lines in Figure 7, and to direct the thread around the package, the latter during this action being retained motionless in position for the thread to be applied therearound.

Disposed vertically above the front edge of the hood is another air jet 29' which directs its jet of air downwardly upon the free end of the thread after the thread has been swirled around the package. This jet catching the free end of the applied thread, forces it downwardly within the range of action of a second suction nozzle 31, see Figs. 7 and 8, which draws the applied thread downwardly so as to cause the winding of the thread to be applied tightly around the package. The next progression of the box beyond the point where it receives the single winding of the severing thread, draws the free end of the thread which is now foreshortened, as indicated in Fig. 5, by the amount consumed in forming a single winding about the package.

The further progression of the box in its step by step advancement finally draws the thread from the mild pulling action exerted by the suction nozzle, thereby maintaining a slight pull on the thread to enable it to closely and evenly hug the package around which it has been wound. At this point after the severing thread has been given a single turn around the package, said package is delivered from the carriers 26, 27 to a second set of similarly arranged carrier belts 39, 40, and are thereby transported step by step, as above explained with reference to the operation of the carriers 26, 27, to the point indicated generally at B, where the packages with their attached threads, are brought into proper alignment with the devices for applying the cover wrapping to the packages.

In the further progression of the packages to the point of application thereto of their cover wrapping, the depending free ends of the threads may likewise be subjected to the action of air jets 29 and suction jet 31 as occasion may require, so as to be prevented from kinking or disarrangement.

On arriving at the point indicated generally at B, and in position, see Fig. 10, to be received in the wrapper applying devices of the wrapping machine, the packages successively occupy a position opposite the vertical line of feed of the wrapping material, which, ordinarily, in wrapping machines, is supplied in the form of a continuous film 41 from a supply reel 42. We do not deem it necessary to specifically describe the feed or control of the wrapping material as the same forms no part of our present invention. It is sufficient to say that the strip of wrapping material is fed downwardly by suitably controlled feeding devices past the line of progression of the boxes. In proper coordination with the operation of the wrapping devices and wrapper feeding mechanism each of the packages with the severing thread applied therearound, is moved transversely across the vertical line of feed of the strip 41 of wrapping material, as for instance, by means of a suitably actuated pusher device 43 and into the receiving jaws 44 of a tumbler device 45. This tumbler device is mounted to be rotatively moved upon a centrally disposed axis 46.

As the packages are successively transferred or pushed from their line of movement into a pair of receiving jaws 44 of the tumbler device 45, the strip of wrapping material 41 is formed into a loop as clearly indicated in Fig. 11 by the movement of the package thereagainst. This loop embraces the package on its forward, upper and lower surfaces and, in the usual operation of wrapper machine, the looped portion is severed from the strip 41 in a sufficient length for the two ends of the severed section to be lapped or folded tightly upon each other and upon the rear edge surface of the package.

The tumbler devices 45 of standard wrapping machines are usually equipped with two sets of jaws 44 disposed at diametrically opposite sides of the tumbler and the two ends of the severed portion of the wrapping material are folded upon each other during the rocking movement of the tumbler device 45 through an arc of 180 degrees so that while a package is being introduced into the receiving jaws 44 of the tumbler device 45 at one side, as shown in Fig. 11, a previously inserted package with a cover of wrapping material applied around it, is in position to be ejected from the pair of jaws at the diametrically opposite side of the tumbler device 45. This ejection is accomplished by a suitably operated ejector bar 47 which operates in timed relation with the pusher bar 43 in the normal operation of the wrapping machine. As shown in Fig. 12, the pusher bar 43 is just completing its work of moving a package into the receiving jaws 44 while the ejector bar 47 is just completing its work of ejecting a package with its wrapper material applied around it from the diametrically oppositely disposed jaws 44.

When these operations are completed the tumbler device 45 is given a half turn of rotative movement upon its axis 46. During this rotative movement of the tumbler device 45, the loose free end of the severing thread 28 of the package which has just been inserted in the receiving jaws of the tumbler device 45 is subjected to the suction action of the suction jet 31 which maintains the free end of the severing thread more or less taut and straightened at least during the commencement of the rotative movement of the tumbler device 45. This action is clearly illustrated in Figs. 11, 12 and 13. At the same time, the free end of the severing thread of the ejected package, see Fig. 13, is maintained under a suction action which is applied thereto during a portion of the rotative movement of the tumbler device 45. Similarly, after being released from the suction action of the jet 31, upon the introduction of the package into the receiving jaws 44 of the tumbler device 45, the free end of the thread 28, during the rotative movement of the tumbler device 45, is eventually brought within the influence of a suction action applied thereto during a portion of the rotative movement of the tumbler device 45. This action is illustrated more clearly in Figs. 13 and 14. To accomplish these results, the package receiving jaws 44 of the tumbler 45 are carried in arms 50 mounted upon the base member 49 of the tumbler device 45. This base member is carried by the axis 46 which is located out of alignment with the line of feed of the packages into and from the receiving jaws 44, see Fig. 15.

On its outer face the base member 49 is recessed to form an annular seat to receive a circular cover member 48. The circular cover member 48 has a central hole therethrough to receive the shaft 46 by means of which the arms 50 are rotated. A collar 46ª is mounted upon the shaft 46 and pinned thereto so as to hold the cover member 48 on its annular seat in the base member 49. The angular adjusting means described below prevents any tendency of the cover member 48 to revolve as the shaft 46 revolves to rotate the arms 50. The collar 46ª is of course adjusted so as to clamp the cover member 48 between it and the base member 49 to form an effective seal at the seat without preventing relative rotation. See Fig. 15. This cover plate is formed with an annular duct or passage, indicated at 51, upon the face thereof which presents towards the outer surface of the base member 49, the latter forming a closure for said duct. Communicating with the duct 51 is a pipe connection 52 which is connected to some convenient member of the intake connection of the air pump or compresser whereby a suction is maintained in the duct 51. Carried by the tumbler base member 49 and extending therethrough are pipe connections 53 which extend respectively to proximity with the respective package receiving jaws at diametrically opposite sides of the tumbler. Cooperating with the outer end of each of the pipe connections 53, is an open-sided receiver 54. The duct 51 is arranged in arc shape concentric with the axis 46 and extends a distance of approximately one-half the complete annular rotation of the tumbler. By reason of this arrangement when the tumbler is rotated to transfer a received package from receiving into discharging position for the package, the pipe connections 53 are brought into and out of communication with the said duct. Thus, as illustrated in Figure 11, the pipe connection 53 at the package receiving position of the jaws 44, is out of communication with the duct 51 and hence, the free end of the severing thread 28 is not subjected to a suction action through said pipe connection. At this point in the operation, the free end of the severing thread is still within the range of action of the suction jet 31.

However, the diametrically opposite pipe connection 53 which is associated with the jaws in package delivery position in the position shown in Figure 11, is in communication with the duct 51 and hence, the free end of the severing thread 51 of the package about to be delivered from the tumbler, is brought within the suction action of said pipe connection 53 which, in this position, is in communication with the duct 51. Therefore, the severing thread of the package about to be discharged from the tumbler, is drawn into and through the receiver 54 and thence through and into the pipe connection 53 and hence is maintained taut around the package and in straightened position and is maintained in this condition as long as the pipe connection 53 remains in communication with the duct 51. These conditions continue to be maintained during the time the package is being transferred from its carrier into the receiving jaws 44 and another package is being discharged from the jaws at the opposite side of the tumbler as clearly illustrated in Fig. 12. When however the tumbler begins its rotating movement to transfer the received package into position to be discharged and for another package to be received in the receiving jaws, the pipe connection 53, associated with the jaws carrying the package, is eventually brought into communication with the duct 51 thereby subjecting the opening thread 28 to the suction action of said pipe connection. At the same time the pipe connection 53 at the opposite side of the tumbler is carried out of communication with duct 51 and hence the suction action upon the severing thread of the discharged package is released and the discharged package is free to be transported to the mechanism of the wrapping machine which folds, tucks and seals the ends of the wrapping material on the package.

This action is maintained during the half turn rotative movement of the tumbler as clearly illustrated in Figs. 13 and 14.

In order to control the points of application of the suction action exerted by pipe connections 53, we propose to adequately regulate the points in the rotative movement of the tumbler device 45, at which the pipe connections communicate or are brought into or out of communication with the duct 51. This may be accomplished in various ways. We have shown a simple arrangement wherein the member 48 in which the duct 51 is formed, is made angularly adjustable. To accomplish this, said member 48 is provided with an extension 56 arranged to extend between oppositely presenting adjusting screws 57 carried by extensions 58 of the frame work of the wrapping machine. By suitably adjusting these screw members the angular displacement of the member 48 is effected, thereby adjusting the points at which the pipe connections 53, which are brought into or carried out of register with the duct 51, are variably controlled.

It will be seen that when the package is delivered from the tumbler, the package has its wrapper opening thread 28 wound one turn around the package and its wrapping material 41 is wrapped around the package in enclosing relation with respect to the single turn winding of the opening thread, the end portions of the wrapping material not having been folded or secured or sealed with respect to the package. This is the condition as illustrated in Fig. 16.

The package is then progressed through the wrapper applying portions of the machine by means of which the ends of the wrapper material are folded upon each other and upon the package and sealed or secured in the usual manner to the package leaving the free end of the severing thread 28 extending freely from the wrapped package. This is the condition as illustrated in Fig. 17. Where a single thickness of wrapper material is to be applied to the package, this operation completes the package ready for delivery to the trade. Where, however, as above described, a double wrapper is to be applied to the packages, the packages in the condition in which they are left as shown in Fig. 17 are returned to the magazine 25 and are fed a second time through the severing-thread control attachments so as to apply a second winding of the free end of the severing-thread around the package and outside of the first wrapper. The various operations incident to the application of a second winding of the free end of the severing thread around the package outside of the first thickness of wrapping material applied thereto are identical with those above described for applying the first winding of the severing thread around the package initially. The same operations and controls of the suction and air blast actions are repeated. The packages are again brought into position indicated at B, to be delivered into the tumbler with a second folding of a second wrapper thereto, and during the rotative transfer action of the tumbler, the same suction action is applied to the free ends of the severing thread, the second wrapper, of course, being applied in enclosing relation with respect to the second winding of the severing thread.

It will be noted that the ends of the strings 28 are shown hanging down in Figure 2 on one side of the machine, and for a shorter distance than they are shown in Figure 1. The packages in the case of a double wrap of covering material are passed through the machine twice. In their first passage through the machine they are placed in the hopper 25 so that the strings hang down on one side of the machine, as indicated in Figure 1. When they issue from the packaging machine they have one wrap of the thread 29 and one wrap of covering material, as clearly indicated in Figure 17. If they are to have a second wrap of covering material applied they are passed through the machine a second time. In this case the packages are placed in the hopper 25, reversed in position so that the shortened threads 28 hang down on the side of the machine, as indicated in Figure 2. To accomplish this the wrapped packages in the condition shown in Figure 17 are stacked in the hopper so that the upper face shown in Figure 17 presents downwardly when mounted in the hopper 25. They then pass through the machine a second time, as illustrated in Figure 18. A set of air jets 29 are placed on this side of the machine to straighten out the threads 28 as before as they approach the hood 33. As before the suction nozzle 31 is positioned adjacent the hood to straighten out the thread placing a lengthwise tension on the ends thereof from which they are successively released as the packages progress beyond the range of influence of the suction nozzle and into the position within the hood to be given a turn around the package.

As is clear from Figures 7 and 8 the side of the hood 33 at the forward edge is cut away at 33″ so that the shortened depending threads 28 during the second passage of the packages through the machine may pass into the hood and be whirled around the package as before. Thus the operation of winding the thread around the package on the second trip through the machine is the same as the operation in wrapping it around the first time, the only difference being that the packages are placed in the hopper so that the depending threads travel along the side of the machine as indicated in Figure 2, with the result that the free terminal end of the thread at the end of the second wrap is at the same side of the machine as the packages are prepared for entry into the tumbler, with the result that the suction nozzles may as before hold the thread in the proper position so that the wrapping material may be applied around the package.

Fig. 20 illustrates the condition of the second wrapper and severing thread when delivered the second time from the tumbler, the ends of the second wrapping not having been folded, lapped or secured upon the package.

Fig. 21 illustrates the condition after the completion of the application in the wrapping machine of the second wrapper, the free end 28 of the severing thread projecting loosely outside of and beyond the second wrapping of wrapping material. This completes the operation and a package is delivered ready for the market with two separate wrappings applied around the package and two separate windings of the severing thread likewise being applied, the one winding inside the first wrapping and the second winding inside the second wrapping. Thus the package is most efficiently protected against access of moisture, thereby thoroughly preserving the contents of the package. We have found that with two such wrappings of "Cellophane" applied to a commercial package, moisture cannot gain access to the contents of the package even when the package has been repeatedly immersed in water or maintained immersed for a considerable period of time.

In order to remove the wrapping where a single winding of the severing thread and a single wrapping is used, as illustrated in Fig. 17, it is only necessary to grasp the protruding or extending free end of the severing thread in the fingers of one hand while holding the package in the other and then unwinding the single winding of the severing thread. This results in severing the wrapping and permitting its severed portions to be slipped off from the package. Exactly the same operation is employed where two windings of the severing thread and two cover wrappings are applied to the package.

In this last instance however, the severing thread is unwound from the package in respect to both of its windings, thereby successively severing the outer and inner wrappings.

It will be obvious that the principles of our invention may be readily and easily available for application of wrappers or wrapping material of various sorts and of severing threads of various kinds to all sorts of commercial packages, such as packages of chemical products, cigarettes, candies, chewing-gum, playing-cards, cigars, and, in fact, all sorts of products ordinarily or usually sold or capable of being sold in package from where it is desired to protect the contents of the package from injury and to preserve the same while being carried in stock or transported.

It is to be understood, of course, that various changes and variations in the details of structure and arrangement, control and operation of wrapping the packages and winding the severing thread, may be effected by those skilled in the art and still fall within the spirit and scope of our invention. We do not therefore desire to be limited or restricted to the exact and specific details of structure, arrangement or operation hereinabove set forth and specifically described, but what we claim as new and useful and of our own invention and desire to secure by United States Letters Patent is:

1. The process which consists in attaching one end of a wrapper severing thread to a package to be wrapped, then winding the free end portion of the thread around the package, then applying a wrapper around the package to enclose the same and the thread winding, the unattached free end of the thread extending outside the wrapper, then winding the extending free end of the thread around the wrapped package exteriorly to the wrapping, and then applying a second wrapper around the wrapped package to enclose the latter and the second winding of the thread, the remaining portion of the unattached end of the thread extending freely outside the second applied wrapper.

2. The process which consists in attaching one end of a wrapper severing thread to a package to be wrapped, then winding the free end portion of the thread in a single turn around the package, then applying a wrapper around the package to enclose the same and the thread winding, the unattached free end of the thread extending outside the wrapper, then winding the extending free end of the thread around the wrapped package exteriorly to the wrapping, and then applying a second wrapper around the wrapped package to enclose the latter and the second winding of the thread, the remaining portion of the unattached end of the thread extending freely outside the second applied wrapper.

3. The process which consists in attaching one end of a wrapper severing thread to a package to be wrapped, then winding the free end portion of the thread in a single turn around the package, then applying a wrapper around the package to enclose the same and the thread winding, the unattached free end of the thread extending outside the wrapper, then winding the extending free end of the thread, in a single turn, around the wrapped package exteriorly to the wrapping, and then applying a second wrapper around the wrapped package to enclose the latter and the second winding of the thread, the remaining portion of the unattached end of the thread extending freely outside the second applied wrapper.

4. The process which consists in attaching one end of a wrapper severing thread to a package to be wrapped, then subjecting the free end portion of the thread to the action of air jets to cause the same to be wound around the package, and then applying a wrapper around the package to enclose the same and the thread winding, the unattached end of the thread beyond its winding upon the package extending freely outside the applied wrapper.

5. The process which consists in attaching one end of a wrapper severing thread to a package to be wrapped, then subjecting the free end portion of the thread to the action of air jets to cause the same to be wound in a single turn around the package, and then applying a wrapper around the package to enclose the same and the thread winding, the unattached end of the thread beyond its winding upon the package extending freely outside the applied wrapper.

6. The process which consists in attaching one end of a wrapper severing thread to a package to be wrapped, then subjecting the free end portion of the thread to the action of air jets to cause the same to be wound around the package, and then applying a wrapper around the package to enclose the same and the thread winding, the unattached end of the thread beyond its winding upon the package extending freely outside the applied wrapper, then winding the extending free end portion of the thread around the wrapped package exteriorly of the applied wrapper, and then applying a second wrapper around the wrapped package to enclose the same and the second winding of the thread, the remaining portion of the unattached end of the thread beyond the second winding thereof extending freely outside the second wrapping.

7. The process which consists in attaching one end of a wrapper severing thread to a package to be wrapped, subjecting the free end portion of the thread to the action of air jets and suction to maintain the same in straightened condition and to wind the same around the package while so maintained, and then applying a wrapper around the package to enclose the same and the thread winding, the unattached end of the thread beyond its winding upon the package extending freely outside the wrapper.

8. The process which consists in attaching one end of a wrapper severing thread to a package to be wrapped, subjecting the free end portion of the thread to the action of air jets and suction to maintain the same in straightened condition and to wind the same around the package while so maintained, and then applying a wrapper around the package to enclose the same and the thread winding, the unattached end of the thread beyond its winding upon the package extending freely outside the wrapper, then subjecting the projecting free end portion of the thread to the action of air jets and suction to maintain the same in straightened condition and to wind the same around the wrapped package while so maintained, and then applying a second wrapper to the previously wrapped package to enclose the latter and the second thread winding, the remaining portion of the free end of the thread extending to the outside of the second wrapper.

9. The process which consists in winding a wrapper severing thread with an air blast around a package to be wrapped, and applying a wrapper around the package to enclose the same and the thread winding, an end of the severing thread extending to the outside of the applied wrapper.

10. The process which consists in winding a wrapper severing thread around a package to be wrapped, and applying a wrapper around the package to enclose the same and the thread winding, an end of the severing thread extending to the outside of the applied wrapper, then winding the extending thread end around the wrapped package exteriorly of the wrapping and applying a second wrapper to the previously wrapped package exteriorly of the second thread winding, an end of the severing thread extending to the outside of the second applied wrapper.

11. The process which consists in winding a wrapper severing thread around a package to be wrapped, and applying a wrapper around the package to enclose the same and the thread winding, an end of the severing thread extending to the outside of the applied wrapper and subjecting the severing thread to the action of air jets and suctions while being wound around the package and while the wrapper is being applied.

12. The process which consists in winding a wrapper severing thread around a package to be wrapped and applying a wrapper around the package to enclose the same and the thread winding, an end of the severing thread extending to the outside of the applied wrapper, then winding the extending thread end around the wrapped package exteriorly of the wrapping and applying a second wrapper to the previously wrapped package exteriorly of the second thread winding, an end of the severing thread extending to the outside of the second applied wrapper, and subjecting the extending portion of the thread to the action of air jets and suction during the thread winding and package wrapping operations.

13. The process which consists in winding a wrapper severing thread around a package to be wrapped, and applying a wrapper around the package to enclose the same and the thread winding, an end of the severing thread extending to the outside of the applied wrapper and subjecting the severing thread to the action of air jets and suction during the thread winding and package wrapping operations.

14. In an apparatus of the class described, the combination with pneumatic means acting first to wind a wrapper severing thread completely around a package to be wrapped, of means to apply a wrapper around the package after the thread has been applied and operating to leave a free end of the thread extending to the outside of the applied wrapper.

15. In an apparatus of the class described, package feeding devices to progress the packages in succession, in combination with means disposed adjacent the line of progression of the packages to wind a wrapper opening thread around the package, and means to apply a wrapper around the thread wound package and permitting the free end of the opening thread to extend outside the wrapper.

16. In an apparatus of the class described, a pair of package feeding belts to progress the packages, in combination with means disposed adjacent the line of progression of the packages to prevent wrapper severing threads carried by the packages from becoming entangled with each other.

17. In an apparatus of the class described, a pair of package feeding belts to progress the packages, in combination with air jet and suction devices disposed adjacent the line of progression of the packages to maintain wrapper severing threads carried by the respective packages separate apart from each other.

18. In an apparatus of the class described, a pair of package feeding belts, in combination with air jet and suction devices disposed adjacent the line of feed of the packages and operating to wind wrapper severing threads around the packages.

19. In an apparatus of the class described, package feeding devices, in combination with a chambered hood disposed transversely across the line of feed of the packages, and air jet and suction devices arranged to act upon wrapper severing threads carried by the respective packages to whirl them through the chambered hood and around the packages.

20. In an apparatus of the class described, package feeding devices in combination with a chambered hood disposed transversely across the line of feed of the packages, air jet and suction devices arranged to act upon wrapper severing threads carried by the respective packages to whirl them through the chambered hood and around the packages, and means to adjust the position of the air jet and suction devices with relation to the chambered hood.

21. In an apparatus of the class described, means to feed packages having wrapper severing threads applied thereto, wrapper feeding mechanisms arranged adjacent and to one side of the line of feed of the packages, means to successively move the packages transversely from their line of feed and across the line of feed of the wrapper to cause the wrappers to enclose the packages and their applied severing threads, and to leave the free ends of the threads protruding beyond the wrappers, and means acting on the free ends of the severing threads to place the threads under tension during wrapping.

22. In an apparatus of the class described, means to feed in succession packages having wrapper severing threads applied thereto, transfer devices to which the packages are delivered, means to interpose package wrapping material between the transfer devices and the line of feed of the packages whereby the wrappers are applied to the packages, and means to tension the severing threads while the wrappers are being applied.

23. In an apparatus of the class described, means to feed in succession packages having wrapper severing threads applied thereto, transfer devices to which the packages are delivered, means to interpose package wrapping material between the transfer devices and the line of feed of the package whereby the wrappers are applied to the packages and air jet and suction devices associated with the transfer devices and acting upon the severing threads to maintain them in applied position around the packages while the wrappers are applied thereto.

24. In an apparatus of the class described, means to feed in succession packages having wrapper severing threads applied thereto, a tumbler device arranged adjacent the line of feed of the packages, said device having diametrically disposed sets of jaws, means to deliver a package into one set of said jaws while another package is delivered from the other set of jaws, and means to interpose package wrappers between the line of feed of the packages and the tumbler device adjacent the point of transfer of the package into the tumbler receiving jaws, means to actuate the tumbler device to apply the wrappers around the packages and their applied wrapper severing threads and suction means for holding the threads while the wrapper is applied.

25. In an apparatus of the class described, means to feed in succession packages having wrapper severing threads applied thereto, a tumbler device arranged adjacent the line of feed of the packages, said device having diametrically disposed sets of jaws, means to deliver a package into one set of said jaws while another package is delivered from the other set of jaws, and means to interpose package wrappers between the line of feed of the packages and the tumbler device adjacent the point of transfer of the packages into the tumbler receiving jaws, means to actuate the tumbler device to apply the wrappers around the package and their applied severing threads and means to maintain the severing threads in applied position around the packages while being carried by the tumbler device.

26. In an apparatus of the class described, means to feed in succession packages having wrapper severing threads applied thereto, a tumbler device arranged adjacent the line of feed of the packages, said device having diametrically disposed sets of jaws, means to deliver a package into one set of said jaws while another package is delivered from the other set of jaws, and means to interpose package wrappers between the line of feed of the packages and the tumbler device adjacent the point of transfer of the package into the tumbler receiving jaws, means to actuate the tumbler device to apply the wrappers around the packages and their applied wrapper severing threads and air jet and suction devices arranged to act upon the severing threads while being transferred by the tumbler devices to maintain said threads in proper applied relation.

27. In an apparatus of the class described, package feeding devices to progress the packages, in combination with air jet and suction devices disposed adjacent the line of progression of the packages to maintain wrapper severing threads carried by the respective packages separate apart from each other and means to guide the threads into the range of action of said jet and suction devices.

28. In an apparatus of the class described, and in combination with means to feed in succession packages having wrapper severing threads wound thereon, of means to apply wrappers to the thread-wound packages, including a rotatable transfer tumbler having package carrying jaws, means to deliver the packages into and from said tumbler and means for holding the thread in position during wrapping.

29. In an apparatus of the class described, and in combination with means to feed in succession packages having wrapper severing threads wound thereon, of means to apply wrappers to the thread-wound packages, including a rotatable transfer tumbler having package carrying jaws, said tumbler having a duct in communication with an air pipe and pipe connections delivering to the tumbler jaws and adapted to be brought into and out of register with said duct during the rotation movement of the tumbler, and means to deliver the packages into and from the tumbler.

30. In an apparatus of the class described, and in combination with means to feed in succession packages having wrapper severing threads wound thereon, of means to apply wrappers to the thread-wound packages, including a rotatable transfer tumbler having package carrying jaws, said tumbler having a duct in communication with an air pipe and pipe connections delivering to the tumbler jaws and adapted to be brought into and out of register with said duct during the rotation movement of the tumbler means to deliver the package into and from the tumbler, and means to adjust the point at which said pipe connections register with said duct, and means to deliver the packages into and from the tumbler.

31. In an apparatus of the type described package feeding devices to progress the packages, each package having a severing thread attached thereto, in combination with means disposed adjacent the line of progression of the packages for winding the threads around the packages, means for applying a wrapper around the packages over the threads, and means for holding the threads in place during wrapping.

JOSEPH C. CARLIN.
GEORGE M. CANFIELD.